Patented Oct. 6, 1931

1,826,594

UNITED STATES PATENT OFFICE

ALFRED FELIX SEBASTIEN BELLONE, OF LYON, FRANCE, ASSIGNOR TO SOCIÉTÉ DES USINES CHIMIQUES RHÔNE-POULENC, OF PARIS, FRANCE

PROCESS FOR THE PRODUCTION OF POTASSIUM MANGANATE

No Drawing. Application filed April 28, 1928, Serial No. 273,774, and in France June 29, 1927.

The invention relates to a process for the production of postassium manganate. It has over the known process the advantage that aqueous caustic potash can be used at relatively low temperatures and without great expenditure of power.

The process consists essentially in blowing oxygen through aqueous, hot caustic potash, which contains in a suspended state the manganese dioxide (manganese peroxide or pyrolusite), whilst providing simultaneously for the intimate contact between gas and liquid. The temperature to be employed can vary between fairly large limits; it must, however, in all cases be sufficient to maintain the mass in a liquid state.

In practice it is desirable to use caustic potash of 70% to 85%, and, in these conditions, a temperature between 160° and 220° C. then suffices, in general, in order to obtain quickly a complete or nearly complete conversion of the manganese dioxide. The invention is, however, limited neither to this concentration nor to the temperatures mentioned. Concentration of 60% and less, for example, likewise produce good results, provided that the temperature, admission of the gas and the duration are chosen correspondingly, so that a partial removal of the water is ensured.

Concentrations over 85% can be used, but are industrially less interesting.

An intimate mixture of gas and liquid is necessary for a rapid conversion; this condition is easily complied with, because the mass contains important quantities of water until the end of the reaction, even with the relatively low temperatures used, it remains, therefore, liquid to the end, which permits of using intensive mixing devices.

In order that the reaction mass remains liquid to the end, an excess of caustic potash must naturally be used. The caustic potash which does not take part in the reaction can easily be recovered, for example, by lixiviating the reaction mass with small quantities of water or of diluted caustic potash lye, or by simple decantation of the molten mass; in this latter case, a highly concentrated caustic potash lye is obtained, which can be directly used again. The manganate, and the impurities of the manganese dioxide, if any, accumulate almost entirely in the lower layer.

The oxygen may contain other gases which are neutral to the substances taking part in the reaction; thus ordinary air may be used, which is particularly cheap, since no increased pressure is needed.

Natural and synthetic manganese dioxide can be used in the process; but other oxides of manganese or compounds which give such oxides, can also be used and converted according to this process into manganate; compounds of manganese oxides with bases can also be used.

A more rapid conversion into manganate is obtained by first treating the manganese dioxide or other manganese compounds for some time with the molten caustic potash and then blowing in the oxygen or the gas mixtures mentioned.

Example 1

6 kgs. of 75% caustic potash are melted in a vessel provided with a stirring apparatus, heated to 180° C., 1 kg. of natural manganese peroxide of about 90% being added.

A stream of air free of carbon dioxide is then directed into the molten mass with a rate of flow of about 300 litres per hour, the mass being kept at 180° C., with stirring. After 18 hours the dioxide is almost quantitatively converted into manganate; the excess caustic potash is separated without difficulty, as, for example, by decanting at 180° C.

Example 2

1.250 kg. of manganese dioxide and 4 litres of potash lye of 50% are introduced into the same apparatus as used in Example 1. A stream of air (1000 litres per hour) is passed through the mass while it is stirred, and heat is applied so that the water evaporates. A further 2 litres of lye are added gradually; a temperature of 210° C. is thus obtained, and is maintained for the whole duration of the reaction. After 12 hours the conversion is almost quantitative. The mass is then treated with a diluted potash lye and the manganate is separated from the alkali by decantation.

*Example 3*

In the same apparatus as used in the preceding Examples, 5.500 kgs. of caustic potash of 81% are melted, 1 kg. of pyrolusite is added and the temperature is brought to and maintained at 180° C. Connection is made with an oxygen gasometer whereby the absorption of the oxygen takes place very rapidly, so that after 8 hours the conversion is completed; separation is effected as above mentioned.

What I claim and desire to secure by Letters Patent is:—

1. The process for the production of potassium manganate which consists in blowing a gas containing oxygen into an excess of melted aqueous caustic potash in which a manganese compound is suspended, maintaining the concentration of the said melted aqueous caustic potash between 65% and 85% throughout the operation, and causing the reaction to proceed at a temperature of 150° to 220° C.

2. The process according to claim 1, in which the manganese compound is a manganese oxide.

3. The process for the production of potassium manganate which consists in blowing a gas containing oxygen into an excess of melted aqueous cautic potash in which a manganese compound is suspended, and maintaining the concentration of the said melted aqueous caustic potash between 65% and 85% until practically all of the manganese compound is transformed into manganate, so that the reacting mass remains liquid throughout the operation.

4. The process according to claim 3, in which the excess of melted aqueous cautic potash is more than twice the theoretical quantity required.

In testimony whereof I have signed my name to this specification.

ALFRED FELIX SEBASTIEN BELLONE.